United States Patent [19]

Brown

[11] 4,271,396
[45] Jun. 2, 1981

[54] INCIDENT RADIATION ABSORBER/REFLECTOR ASSEMBLY

[75] Inventor: Donald G. Brown, Newbury Park, Calif.

[73] Assignee: The United States of America as represented by the Secretary of the Air Force, Washington, D.C.

[21] Appl. No.: 1,330

[22] Filed: Jan. 5, 1979

[51] Int. Cl.³ .............................................. H07S 3/08
[52] U.S. Cl. ............................................. 331/94.5 C
[58] Field of Search ................... 331/94.5 C, 94.5 D; 350/293, 96.1, 294, 299; 126/438, 439

[56] References Cited

U.S. PATENT DOCUMENTS

| | | | |
|---|---|---|---|
| 3,445,785 | 5/1969 | Koester et al. | 331/94.5 D |
| 3,538,453 | 11/1970 | Miller | 331/94.5 C |
| 3,699,471 | 10/1972 | Mulready et al. | 331/94.5 D |
| 3,986,490 | 12/1976 | Chao et al. | 126/438 |

OTHER PUBLICATIONS

"abc's of infrared" by B. Bernard, Samsand Co., Bobbs-Merrill Co., pp. 7 and 24.

Primary Examiner—William L. Sikes
Assistant Examiner—Leon Scott
Attorney, Agent, or Firm—Donald J. Singer; Jacob N. Erlich

[57] ABSTRACT

An incident radiation absorber/reflector assembly having a mounting housing to which is adjustably secured an absorber body and a reflector element. An entrance opening, aligned with the reflector element, is formed within the body. The entrance opening is connected to a cylindrical cavity within the body by a tapered passageway which is offset from the longitudinal axis of the cavity. Any incident radiation intercepted by the reflector element is directed by the reflector element into the cavity where it is substantially absorbed by the absorber body.

9 Claims, 3 Drawing Figures

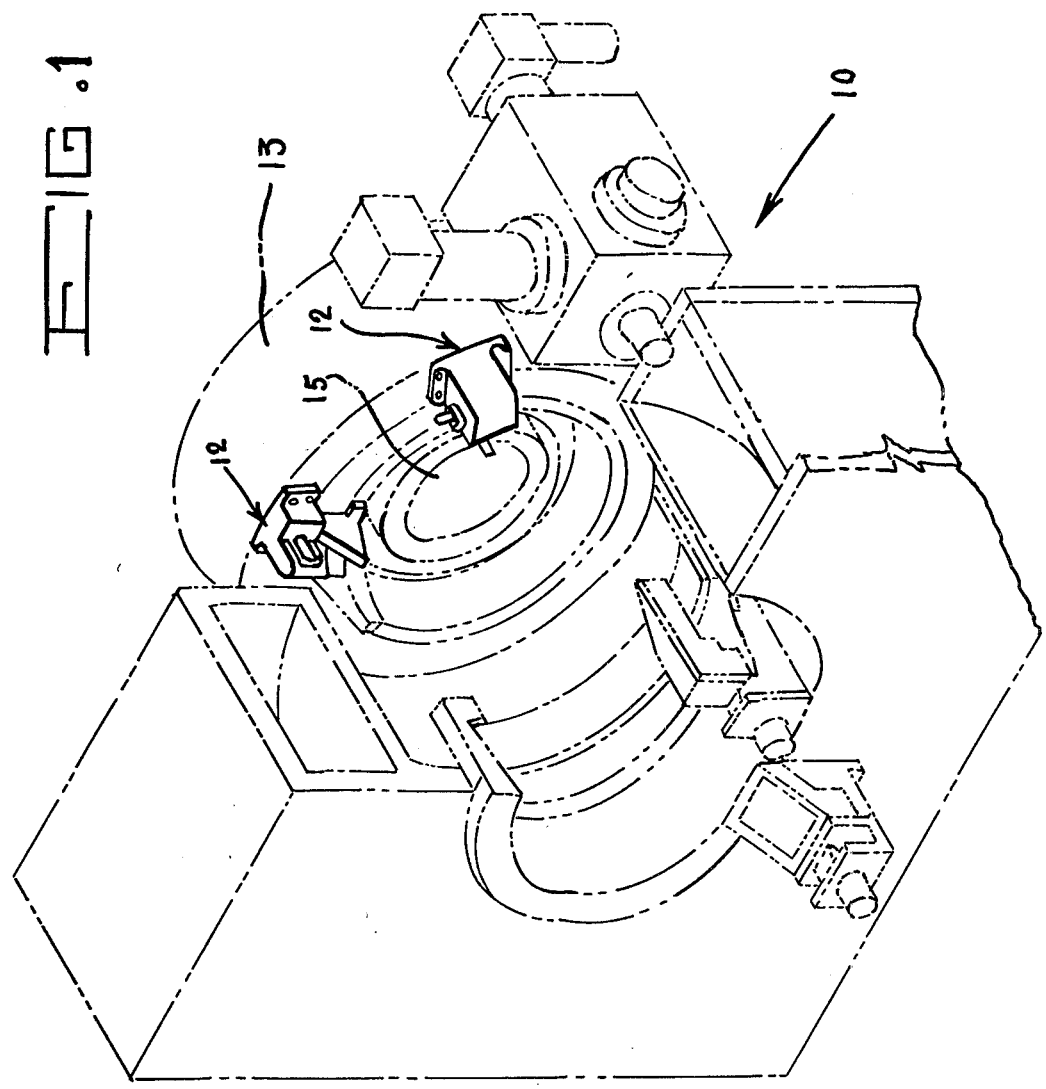

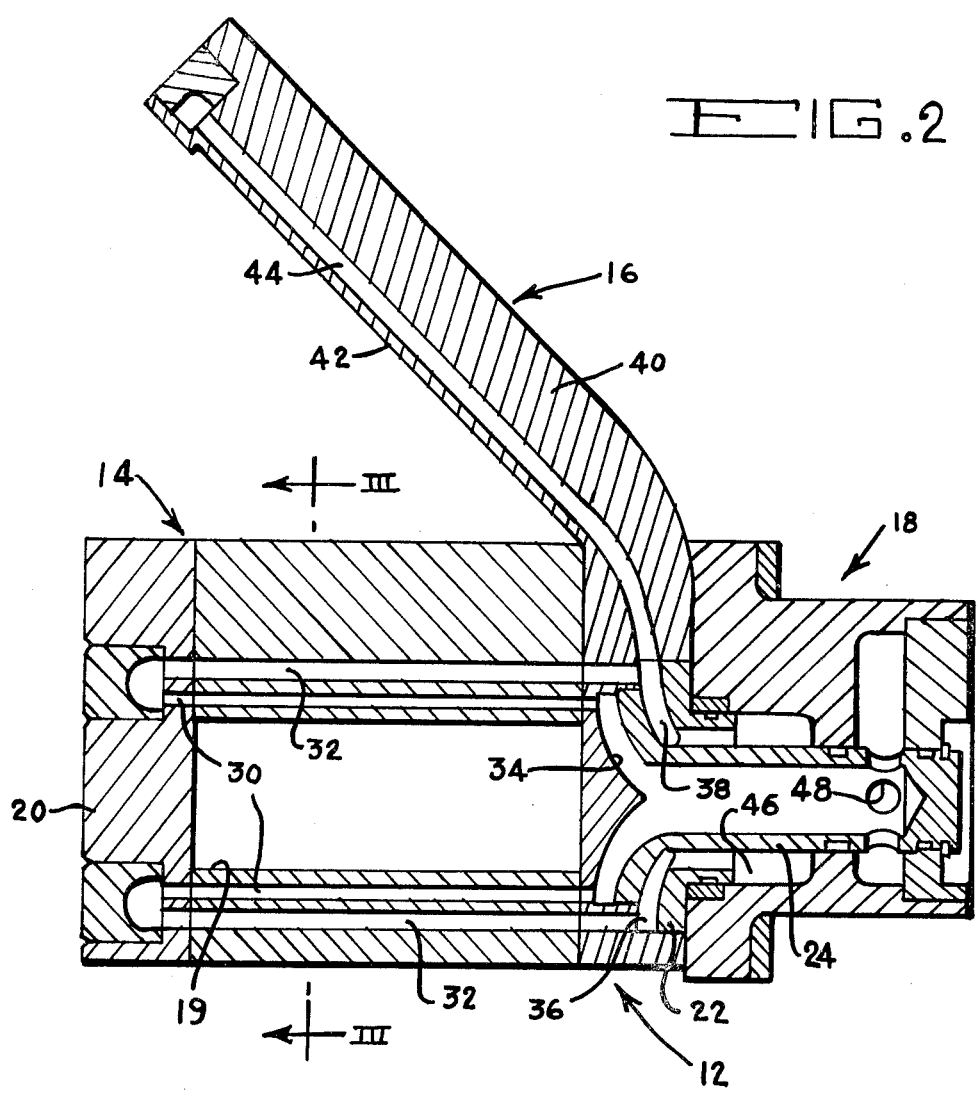
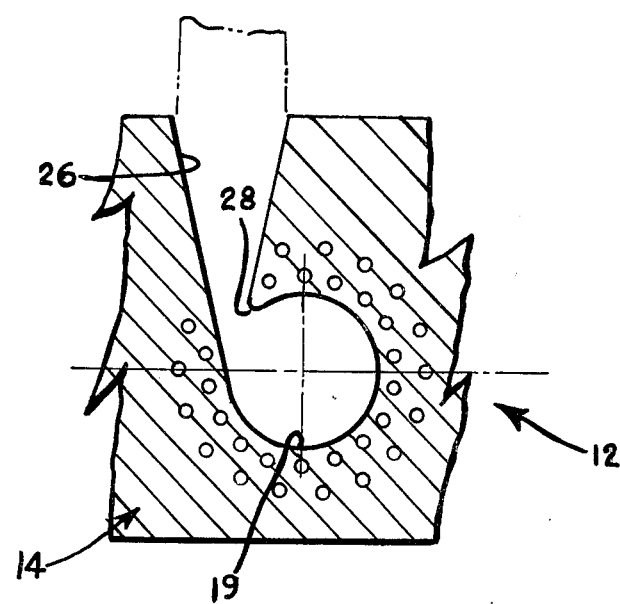

INCIDENT RADIATION ABSORBER/REFLECTOR ASSEMBLY

STATEMENT OF GOVERNMENT INTEREST

The invention described herein may be manufactured and used by or for the Government for governmental purposes without the payment of any royalty thereon.

BACKGROUND OF THE INVENTION

This invention relates generally to lasers, and, more particularly to an incident radiation absorber/reflector assembly for use in conjunction with a laser.

The development of the laser has created a new area of technology which finds application in many systems already in existence today. For example, lasers can be found in the areas of optical communication, holography, medicine, cutting, calculating and radar. The utilization of the laser in such areas is in many instances dependent upon the amplification of the existing laser radiation.

In certain areas, such as in optical communications or optical radar, it is necessary to greatly amplify the initial radiation power produced by the laser. One laser which produces such high output power is the cylindrical chemical laser. In such a laser, or in most conventional lasers, the "optical or resonant cavity" of the laser typically comprises plane parallel or curved mirrors located at right angles to the axis of the cylindrical region. The cylindrical region may be in the form of a gas envelope or the like in which the lasing action takes place. For laser operation, one of the mirrors is required to be partially transmissive in order to extract a useful beam of coherent light from the "optical cavity".

Such high power lasers as described hereinabove frequently contain components such as supporting structures or struts which are exposed to incident radiation during laser operation. In addition, the radial feed passages located, for example, within the struts, and required to feed a high power chemical laser are exposed to very high heat loads from impingement of incident coherent radiation (up to 100 Btu/sec/in$^2$). This heat load will destroy any known material unless adequately protected. Furthermore, the reflected coherent radiation from such sources can cause parasitic losses so as to render the entire laser ineffectual.

In many instances, the above mentioned problems have been overcome by an incident radiation absorber as set forth in Application Ser. No. 1,334, entitled Incident Radiation Absorber filed Jan. 5, 1979 by the inventor of the instant application. Unfortunately, in many areas of the laser there is insufficient room to provide for the incident radiation absorber as set forth in Ser. No. 1,334 identified hereinabove. It is still essential, however, in those areas of the laser where there is insufficient room or because of undesirable placement of the strut to eliminate sources of incident radiation and therefore allow for optimum laser operation.

SUMMARY OF THE INVENTION

The instant invention overcomes the problems encountered in the past by providing an incident radiation absorber/reflector assembly which as a result of its single unit construction is capable of being easily incorporated in many of the areas of a laser in which, due to lack of space, other types of absorbers cannot be placed.

The incident radiation absorber/reflector assembly of this invention is generally secured to the supporting structure of a laser in those areas of a laser susceptible to incident radiation so as to intercept any incident radiation which may have a deleterious effect on laser operation. By the addition of the absorber/reflector assembly of this invention within an already existing laser, damage to the laser due to incident radiation is substantially eliminated without the introduction of additional stray beams of radiation that would additionally cause parasitic losses within the laser. Furthermore, the positioning of the incident radiation absorber/reflector assembly of this invention is not dependent upon the positioning of, for example, the supporting struts of the laser since the assembly provides a self contained unit capable of absorbing incident radiation.

The absorber/reflector assembly is made up of a box a like unit having protruding therefrom at a preset angle a reflector element. The box-like unit is constructed of a body and a housing to which the body is attached. The body is made of a substantially square compact configuration having an entrance opening directly aligned with the reflector element. This opening, which allows for the incident radiation to enter the body, is joined to a centrally located cylindrically shaped cavity within the body of the absorber/reflector assembly of this invention by a tapered passageway. Surrounding the cylindrical cavity within the body, are a plurality of cooling passageways which may be formed by a plurality of longitudinal extending channels radially removed from the cylindrical cavity. The coolant channels are fed by way of a pair of entrance and exit conduits. The conduits are connected to the housing which allows for some degree of adjustability of the body with respect thereto. In addition, a cooling passageway may be provided within the reflector element itself.

With the utilization of the incident radiation absorber/reflector assembly of this invention in a conventional cylindrical chemical laser, the reflector element is capable of directing into the cylindrical cavity within the body any undesirable incident radiation. By offsetting the tapered passageway with respect to the cylindrical cavity and proportioning the entrance angle of the opening and cavity diameter accordingly, the incident radiation which enters the cylindrical cavity can be made to reflect around the inside of the cavity until it is almost entirely absorbed or dissipated within the body with very little radiation escaping back out the entrance opening. The entire body of the assembly of this invention is generally water cooled and can have some degree of adjustability with respect to the housing.

It is therefore an object of this invention to provide an absorber/reflector assembly which is readily incorporated within a laser and is capable of removing substantially all incident radiation directed thereupon.

It is another object of this invention to provide an incident radiation absorber/reflector assembly which is capable of some degree of adjustment so as to readily intercept any undesirable incident radiation.

It is still a further object of this invention to provide an incident radiation absorber/reflector assembly which is entirely cooled during its operation.

It is still a further object of this invention to provide an incdent radiation absorber/reflector assembly which is economical to produce and which utilizes conventional, currently available components that lend themselves to standard mass producing manufacturing techniques.

For a better understanding of the present invention together with other and further objects thereof, reference is made to the following description taken in conjunction with the accompanying drawing and its scope will be pointed out in the appended claims.

DETAILED DESCRIPTION OF THE DRAWING

FIG. 1 is a pictorial representation of a typical cylindrical chemical laser showing the support structure of the laser including the areas of the supporting structure to which the incident radiation absorber/reflector assembly of this invention is secured;

FIG. 2 is a side elevational view of the incident radiation absorber/reflector assembly of this invention shown partly in cross section; and FIG. 3 is a cross sectional view of the incident radiation absorber/reflector assembly of this invention taken along line III—III of FIG. 2.

DETAILED DESCRIPTION OF THE PREFERRED EMBODIMENT

Reference is now made to FIG. 1 of the drawing which shows in pictorial fashion a typical conventional cylindrical chemical laser 10 which incorporates therein a plurality of the incident radiation absorber/reflector assemblies 12 of this invention. Cylindrical laser 10 is generally made up of an outer support structure 13 which fixedly secures in the center thereof a gain generator 15. In order to protect the laser from incident radiation a plurality of absorber/reflector assemblies 12 are positioned about and secured to the supporting structure 13 of laser 10. Although the absorber reflector assembly 12 of this invention is generally used with the cylindrical chemical laser 10 shown in the drawing it can be readily incorporated in any laser.

Reference is now made to FIGS. 2 and 3 of the drawing which clearly illustrate the absorber/reflector assembly 12 of this invention. Absorber/reflector assembly 12 is formed of a box-like unit made up of a body 14, a reflector element 16 and a support housing 18. Although reflector element 16 is shown as a separate element interposed between body 14 and housing 18 it may, within the scope of this invention, be formed as an integral part of either body 14 or housing 18.

Body 14 is made as compact as possible so as to fit in any area within the laser which, in many instances, is unacceptable for traditional absorbers. Consequently, body 14 is made, preferably, in a substantially square configuration. Located within body 14 is a cylindrical cavity 19 having its ends enclosed by a pair of end plates 20 and 22. In the embodiment shown in FIG. 2 of the drawing reflector element 16 is formed as an integral part of end plate 22. In addition, end plate 22 accepts an elongated member 24 which is adjustably and/or rotatably mounted within housing 18 in order to adjustably support body 14.

Reference is now made to FIG. 3 of the drawing which more clearly illustrates cylindrical cavity 19. Body 14 has an entrance opening 26 which is joined to cavity 19 by way of a tapered passageway 28. This passageway is offset from the longitudinal axis of cylindrical cavity 19 in order to allow the incident radiation to enter cavity 19 in such a manner as to be retroreflected thereabout. In addition opening 26 is optically aligned with reflector element 16. In this manner, incident radiation can be intercepted by reflector element 16 and reflected into entrance opening 26 and into the cylindrical cavity 19. In cavity 19 the incident radiation is continually reflected before being dissipated and absorbed by the sidewalls of cavity 19 which are made, preferably, of a highly absorbent material such as copper.

In order to reduce the heating which may take place within body 14 of absorber/reflector assembly 12 of this invention a plurality of longitudinal extending entrance and exit channels 30 and 32, respectively, surround the cylindrical cavity 19 displaced therefrom in the radial direction. Passageway 30 is operably connected to an input conduit 34 while passageway 32 is operably connected to an exit conduit 36. These conduits 34 and 36 may be formed within an end plate 22 of the assembly 12 of this invention. In addition, cooling fluid can be directed to the reflector element 16 by way of additional conduit 38 in a manner to be described in more detail hereinbelow.

Referring once again to FIG. 2 of the drawing, end plate 22 has attached thereto reflector element 16 formed of an elongated member which protrudes from end plate 22 at a preset angle with respect to body 14 so as to direct incoming incident radiation into entrance opening 26. Reflector element 16 may be made of a single element having coolant channels 44 formed therein and connected to conduit 38. It can also be made of a pair of plates 40 and 42 with channels 44 formed in plate 40 and covered by plate 42.

The combination of reflector 16 and body 14 of absorber/reflector assembly 12 can be adjustably or rotatably mounted in a conventional manner by element 24 within housing 18. Housing 18 is secured to the outer structure 13 of laser 10. Cooling fluid is supplied to body 14 and reflector 16 by a passageway 46 located in element 24. This passageway is fed by any coolant supply system (not shown) through inlet 48. Any number of absorber/reflector assemblies 12 can be utilized within laser 10 so as to substantially reduce the incident radiation within the laser.

Although this invention has been described with reference to a particular embodiment, it will be understood that this invention is also capable of further and other embodiments within the spirit and scope of the appended claims.

I claim:

1. An incident radiation absorber/reflector assembly comprising a mounting housing, an absorber body, said body being made of a radiation absorbing material and having a cylindrical cavity formed substantially in the center thereof, an entrance opening formed within said body connected to said cylindrical cavity by a tapered passageway offset from the longitudinal axis of said cylindrical cavity, a reflector element, said reflector element protruding from said body at a predetermined angle so as to reflect incident radiation into said entrance opening, said body and said reflector element being adjustably secured to said mounting housing whereby said incident radiation is intercepted by said reflector element and directed by said reflector element into said cavity where it is substantially absorbed by said absorber body, and a plurality of cooling channels located about said cylindrical cavity, a cooling passageway located within said reflector element and means located within said mounting housing for feeding coolant to said cooling channels.

2. An incident radiation absorber/reflector assembly as defined in claim 1 wherein said cylindrical cavity is enclosed by a pair of end plates, at least one end plate having conduits therein for connecting said coolant feeding means to said channels.

3. An incident radiation absorber/reflector assembly as defined in claim 2 wherein said reflector element forms part of one of said end plates.

4. An incident radiation absorber/reflector assembly as defined in claim 3 wherein said body is made of a material which has substantially greater absorption characteristics than reflection characteristics.

5. An incident radiation absorber/reflector assembly as defined in claim 4 wherein said coolant feeding means also adjustably connects said body to said mounting housing.

6. An incident radiation absorber/reflector assembly as defined in claim 5 wherein said cooling channels in said body are in the form of entrance and exit channels disposed radially about said cylindrical cavity.

7. In a laser having a gain generator and a surrounding outer support structure, the improvement therein being in form of an incident radiation absorber/reflector assembly secured to said outer support structure, said absorber/reflector assembly comprising a mounting housing, an absorber body, said body being made of a radiation absorbing material and a reflector element, said body having a cylindrical cavity formed substantially in the center thereof, an entrance opening formed within said body connected to said cylindrical cavity by a tapered passageway offset from the longitudinal axis of said cylindrical cavity, said reflector element protruding from said body at a predetermined angle so as to reflect incident radiation into said entrance opening, and said body and said reflector element being adjustably secured to said mounting housing whereby said incident radiation is intercepted by said reflector element and directed by said reflector element into said cavity where it is substantially absorbed by said absorber body.

8. In a laser as defined in claim 7 further comprising a plurality of cooling channels located about said cylindrical cavity, a cooling passageway located within said reflector element and means located within said mounting housing for feeding cooling to said coolant channels.

9. In a laser as defined in claim 8 wherein said cylindrical cavity is enclosed by a pair of end plates, at least one end plate having conduits therein for operably connecting said coolant feeding means to said channels.

* * * * *